(12) United States Patent
Le-Khac et al.

(10) Patent No.: US 6,696,383 B1
(45) Date of Patent: Feb. 24, 2004

(54) DOUBLE-METAL CYANIDE CATALYSTS WHICH CAN BE USED TO PREPARE POLYOLS AND THE PROCESSES RELATED THERETO

(75) Inventors: Bi Le-Khac, West Chester, PA (US); Wei Wang, Boothwyn, PA (US)

(73) Assignees: Bayer Polymers LLC, Pittsburgh, PA (US); Bayer Antwerpen, N.V., Antwerp (BE)

( * ) Notice: Subject to any disclaimer, the term of this patent is extended or adjusted under 35 U.S.C. 154(b) by 0 days.

(21) Appl. No.: 10/251,155

(22) Filed: Sep. 20, 2002

(51) Int. Cl.$^7$ ................................................. B01J 27/26
(52) U.S. Cl. ........................................ 502/175; 502/200
(58) Field of Search ................................. 502/175, 200

(56) References Cited

U.S. PATENT DOCUMENTS

| | | | |
|---|---|---|---|
| 3,278,459 A | 10/1966 | Herold | |
| 3,404,109 A | 10/1968 | Milgrom | |
| 3,427,256 A | 2/1969 | Milgrom | |
| 3,829,505 A | 8/1974 | Herold | |
| 3,941,849 A | 3/1976 | Herold | |
| 4,472,560 A | 9/1984 | Kuyper et al. | 526/120 |
| 4,477,589 A | 10/1984 | van der Hulst et al. | 502/169 |
| 5,470,813 A | 11/1995 | Le-Khac | 502/175 |
| 5,482,908 A | 1/1996 | Le-Khac | 502/156 |
| 5,536,883 A | 7/1996 | Le-Khac | 568/620 |
| 5,545,601 A | 8/1996 | Le-Khac | 502/156 |
| 5,693,584 A | 12/1997 | Le-Khac | 502/159 |
| 5,712,216 A | 1/1998 | Le-Khac et al. | 502/175 |
| 5,714,428 A | 2/1998 | Le-Khac | 502/159 |
| 6,013,596 A | 1/2000 | Le-Khac et al. | 502/175 |
| 6,018,017 A | 1/2000 | Le-Khac | 528/421 |
| 6,423,662 B1 | 7/2002 | Molzahn et al. | 502/175 |

FOREIGN PATENT DOCUMENTS

| | | |
|---|---|---|
| JP | 4-145123 | 5/1952 |
| JP | 5-17569 | 1/1993 |
| JP | 5-25267 | 2/1993 |
| WO | 01/04180 | 1/2001 |
| WO | 02/09875 | 2/2002 |

OTHER PUBLICATIONS

Journal of Polymer Scienc Part A: Polymer Chemistry vol. 40, (month unavailable)(2000), pp. 1142–1150, Yi–Jun Huang, Guo–Rong Qi, Yu–Hua Wang, "Controlled Ring–Opening Polymeriation of Propylene Oxide Catalyzed by Double Metal–Cyanide Complex".

Primary Examiner—Elizabeth Wood
(74) Attorney, Agent, or Firm—Joseph C. Gil; John E. Mrozinski, Jr.

(57) ABSTRACT

The present invention is directed to double metal cyanide catalysts ("DMC") which can be used to prepare polyols. DMC catalysts of the present invention are prepared by combining i) at least one metal salt; ii) at least one metal cyanide salt; iii) at least one organic complexing ligand; iv) at least one alkaline metal salt; and, optionally, v) at least one functionalized polymer. The present invention is also directed to a process for preparing a polyol in the presence of a DMC catalyst prepared according to the process of the present invention.

Surprisingly, DMC catalysts of the present invention, which are preferably prepared with at least one alkaline metal halide, have acceptable activity and can be used to catalyze oxyalkylation reactions. Additionally, DMC catalysts produced by the process of the present invention can be used to prepare polyols which have reduced levels of high weight tail.

14 Claims, No Drawings

DOUBLE-METAL CYANIDE CATALYSTS WHICH CAN BE USED TO PREPARE POLYOLS AND THE PROCESSES RELATED THERETO

TECHNICAL FIELD OF THE INVENTION

The present invention is directed to double-metal cyanide ("DMC") catalysts which can be used to prepare polyols. The present invention is also directed to a process for preparing DMC catalysts. The present invention is further directed to a process for polymerizing an alkylene oxide in the presence of a DMC catalyst prepared according to the process of the present invention.

BACKGROUND OF THE INVENTION

In the preparation of polyoxyalkylene polyols, starter compounds having active hydrogen atoms are oxyalkylated with alkylene oxides in the presence of a suitable catalyst. For many years, basic as well as DMC catalysts have been used in oxyalkylation reactions to prepare polyoxyalkylene polyols. Base-catalyzed oxyalkylation involves oxyalkylating a low molecular weight starter compound (such as propylene glycol or glycerine) with an alkylene oxide (such as ethylene oxide or propylene oxide) in the presence of a basic catalyst (such as potassium hydroxide (KOH)) to form a polyoxyalkylene polyol.

In base-catalyzed oxyalkylation reactions, propylene oxide and certain other alkylene oxides are subject to a competing internal rearrangement which generates unsaturated alcohols. For example, when KOH is used to catalyze an oxyalkylation reaction using propylene oxide, the resulting product will contain allyl alcohol-initiated, monofunctional impurities. As the molecular weight of the polyol increases, the isomerization reaction becomes more prevalent. As a result, 800 or higher equivalent weight poly (propylene oxide) products prepared using KOH tend to have significant quantities of monofunctional impurities. Monofunctional impurities tend to reduce the average functionality and broaden the molecular weight distribution of the polyol.

Unlike basic catalysts, DMC catalysts do not significantly promote the isomerization of propylene oxide. As a result, DMC catalysts can be used to prepare polyols which have low unsaturation values and relatively high molecular weights. DMC catalysts can be used to produce polyether, polyester and polyetherester polyols which are useful in applications such as polyurethane coatings, elastomers, sealants, foams and adhesives.

DMC-catalyzed oxyalkylation reactions, however, are known to produce small amounts of high molecular weight polyol impurities (typically, molecular weights in excess of 100,000 Da). These high molecular weight impurities are often referred to as the "high molecular weight tail". In elastomers and other systems, the high molecular weight tail may interfere with hard segment phase out as well as with the alignment of hard segments responsible for strength and modulus properties. In polyurethane foam systems, for example, polyols which have a high molecular weight tail produce course foam cells, very tight foams or weak foams or contribute to foam collapse.

DMC catalysts are known and are described in, for example, U.S. Pat. Nos. 3,278,457, 3,278,459, 3,289,505, 3,427,256, 4,477,589, 5,158,922, 5,470,813, 5,482,908, 5,545,601, 5,627,122 and 6,423,662 as well as in WO 01/04180 and WO 02/09875. DMC catalysts are typically prepared by mixing an aqueous solution of a metal salt with an aqueous solution of a metal cyanide salt in the presence of an organic complexing ligand. A precipitate forms when these two solutions are mixed together. The resulting precipitate is isolated and then washed.

The art teaches that, during the preparation of a DMC catalyst, alkaline metal salts are incorporated into the catalyst. See Huang et al., "Controlled Ring-Opening Polymerization of Propylene Oxide Catalyzed by Double Metal-Cyanide Complex,", *Journal of Polymer Science*, Vol.40, page 1144 (2002); U.S. Pat. No. 3,278,457, column 5, lines 40–44; and WO 02/09875, page 5, lines 5–12. The art also teaches that these occluded ions must be removed during the preparation of a DMC catalyst. See Huang et al., page 1144; U.S. Pat. No. 3,278,457, column 5, lines 57–58; and WO 02109875, page 5, lines 5–12. U.S. Pat. No. 6,423,662 (at column 6, lines 47–50), WO/01/04180 (at page 8, lines 17–19), and U.S. Pat. No. 3,278,457 (at column 5, lines 45–58), for example, teach those skilled in the art to wash the precipitate formed during the preparation of a DMC catalyst as thoroughly as possible in order to remove essentially all of these occluded ions.

SUMMARY OF THE INVENTION

The present invention is directed to process for preparing a DMC catalyst which involves combining: i) at least one metal salt; ii) at least one metal cyanide salt; iii) at least one organic complexing ligand; iv) at least one alkaline metal salt; and, optionally, v) at least one functionalized polymer.

The present invention is also directed to a process for preparing a polyol in the presence of a DMC catalyst prepared according to the process of the present invention.

The present invention is also directed to a DMC catalyst which is represented by the following general formula (I)

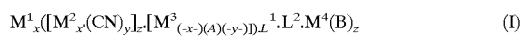

$$M^1_x([M^2_{x'}(CN)_y]_z\cdot[M^3_{(x-)(A)(-y-)}]_{t'}\cdot L^1\cdot L^2\cdot M^4(B)_z \quad (I)$$

Surprisingly, DMC catalysts of and produced by the process of the present invention, which are preferably prepared with at least one alkaline metal halide, have acceptable activity and can be used to catalyze oxyalkylation reactions. Additionally, DMC catalysts produced by the process of the present invention can be used to produce polyols which have reduced levels of high molecular weight tail.

DESCRIPTION OF THE INVENTION

In a first aspect, the present invention is a process for preparing a DMC catalyst comprising combining: i) at least one metal salt; ii) at least one metal cyanide salt; iii) at least one organic complexing ligand; iv) at least one alkaline metal salt; and, optionally, v) at least one functionalized polymer, under conditions sufficient to form a catalyst.

In a second aspect, the present invention is a process for preparing a polyol comprising reacting i) at least one starter compound having active hydrogen atoms with ii) at least one oxide in the presence of iii) at least one DMC catalyst which is prepared according to the process of the present invention, under conditions sufficient to form a polyol.

In another aspect, the present invention is a DMC catalyst which is represented by the formula $M^1_x([M^2_{x'}(CN)_y]_z\cdot[M^3_{(-x-)}(A)_{(-y-)}])\cdot L^1\cdot L^2\cdot M^4(B)_z$, wherein $M^1$ represents at least one metal;

$[M^2_{x'}(CN)_y]$ represents at least one metal cyanide;

$[M^3_x(A)_y]$ represents at least one transition metal salt;

$M^4(B)_z$ represents at least one alkali metal salt;

$L^1$ represents at least one organic complexing ligand;

$L^2$ is optional and can represent at least one functionalized polymer; and x, x', y and z are integers and are chosen such that electroneutrality of the DMC catalyst exists.

In yet another aspect, the present invention is a process for preparing a polyol comprising reacting i) at least one starter compound having active hydrogen atoms with ii) at least one oxide in the presence of iii) at least one DMC catalyst which is represented by the formula

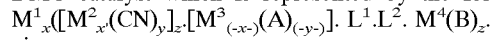

wherein $M^1$ represents at least one metal;

$M^2_{x'}(CN)_y$ represents at least one metal cyanide;

$[M^3_x(A)_y]$. represents at least one transition metal salt;

$M^4(B)_z$ represents at least one alkaline metal salt;

$L^1$ represents at least one organic complexing ligand;

$L^2$ is optional and can represent at least one functionalized polymer; and x, x', y and z are integers and are chosen such that electroneutrality of the DMC catalyst exists.

Any metal salt can be used in the present invention. Preferably, water soluble metal salts which are known in the art are used in the present invention. Examples of metal salts which are useful in the present invention include, for example, zinc chloride, zinc bromide, zinc acetate, zinc cetylacetonate, zinc benzoate, zinc nitrate, zinc propionate, zinc formate, iron(II) sulfate, iron(II) bromide, cobalt(II) chloride, cobalt(II) thiocyanate, nickel(II) formate, nickel (II) nitrate and mixtures thereof.

Any metal cyanide salt can be used in the present invention. Examples of metal cyanide salts which can be used in the present invention include, for example, cyanometalic acids and water-soluble metal cyanide salts. Preferably, water soluble metal cyanide salts which are known in the art are used in the present invention. Metal cyanide salts which are useful in the invention include, for example,potassium hexacyanocobaltate(III), potassium hexacyanoferrate(II), potassium hexacyanoferrate(II), lithium hexacyanoiridate (III), lithium hexacyanocobaltate(III), sodium hexacyanocobaltate(III) and cesium hexacyanocobaltate(III) are used in the present invention.

Metal salts of the present invention are preferably combined with metal cyanide salts of the present invention to form DMC compounds. DMC compounds which are useful in the present invention include, for example, zinc hexacyanocobaltate(III), zinc hexacyanoiridate(III), zinc hexacyanoferrate(II), zinc hexacyanoferrate(III), zinc hexacyanocolbaltic acid, cobalt(II) hexacyanocobaltate(III) and nickel(II) hexacyanoferrate(II). Zinc hexacyanocobaltate is particularly preferred.

Any organic complexing ligand can be used in the present invention. Organic complexing ligands useful in the present invention are known and are described in, for example, U.S. Pat. Nos. 3,404,109, 3,829,505, 3,941,849, 5,158,922 and 5,470,813, as well as in EP 700 949, EP 761 708, EP 743 093, WO 97/40086 and JP 4145123. Organic complexing ligands useful in the present invention include, for example, water-soluble organic compounds with heteroatoms, such as oxygen, nitrogen, phosphorus or sulfur, which can form complexes with the DMC compound.

Suitable organic complexing ligands useful in the present invention include, for example, alcohols, aldehydes, ketones, ethers, esters, amides, ureas, nitriles, sulfides and mixtures thereof. Preferred organic complexing ligands useful in the present invention include water-soluble aliphatic alcohols, such as, for example, ethanol, isopropanol, n-butanol, iso-butanol, sec-butanol and tert-butanol. Tert-butanol is particularly preferred.

Any alkaline metal salt can be used in the present invention. Preferably, alkali metal halides are used in the present invention. More preferably, sodium chloride, sodium bromide, sodium iodide, lithium chloride, lithium bromide, lithium iodide, potassium chloride, potassium bromide, potassium iodide and mixtures thereof are used in the present invention.

The relative amounts of organic complexing ligand and alkaline metal salt used in the present invention can vary. A skilled person can control catalyst activity, polyol viscosity and the like by varying these amounts. Preferably, DMC catalysts produced by the process of the present invention are composed of at least one alkaline metal salt which is present in an amount within the range of from about 0.1 to about 10 wt. %, more preferably, from about 0.4 to about 6 wt. %, most preferably, from about 1 to about 3 wt. %, based on the total weight of the DMC catalyst.

DMC catalysts of the present invention can optionally include at least one functionalized polymer. "Functionalized polymer" is defined as a polymer or its salt which contains one or more functional groups including oxygen, nitrogen, sulfur, phosphorus or halogen. Examples of functionalized polymers useful in the present invention include, for example: polyethers; polyesters; polycarbonates; polyalkylene glycol sorbitan esters; polyalkylene glycol glycidyl ethers; polyacrylamides; poly(acrylamide-co-acrylic acids), polyacrylic acids, poly(acrylic acid-co-maleic acids), poly (N-vinylpyrrolidone-co-acrylic acids), poly(acrylic acid-co-styrenes) and their salts; maleic acids, styrenes and maleic anhydride copolymers and their salts; block copolymers which are composed of branched chain ethoxylated alcohols; alkoxylated alcohols such as NEODOL which is sold commercially by Shell Chemical Company; polyether; polyacrylonitriles; polyalkyl acrylates; polyalkyl methacrylates; polyvinyl methyl ethers; polyvinyl ethyl ethers; polyvinyl acetates; polyvinyl alcohols; poly-N-vinylpyrrolidones; polyvinyl methyl ketones; poly(4-vinylphenols); oxazoline polymers; polyalkyleneimines; hydroxyethylcelluloses; polyacetals; glycidyl ethers; glycosides; carboxylic acid esters of polyhydric alcohols; bile acids and their salts, esters or amides; cyclodextrins; phosphorus compounds; unsaturated carboxylic acid esters; and ionic surface- or interface-active compounds. Polyether polyols are preferably used.

When used, functionalized polymers are present in the DMC catalyst in an amount within the range of from about 2 to about 80 wt. %, preferably, within the range of from about 5 to about 70 wt. %, more preferably, within the range of from about 10 to about 60 wt. %, based on the total weight of DMC catalyst.

The combination of metal salt, metal cyanide salt, organic complexing ligand, alkali metal salt and, optionally, functionalized polymer, can be accomplished by any of the methods known in the art. Such methods include, for example, precipitation, dispersion and incipient wetness. Preferably, the process of the present invention involves using a precipitation method in which an aqueous solution of at least one metal salt employed in a stoichiometric excess, i.e., at least 50 mol. %, based on the molar amount of metal cyanide salt, is mixed with an aqueous solution of at least one metal cyanide salt, at least one alkali metal salt and, optionally, at least one functionalized polymer, in the presence of at least one organic complexing ligand.

The alkali metal salt can be added to either the aqueous solution of metal salt or to the aqueous solution of metal cyanide salt or to both solutions or to the mixture after the two solutions are combined. Preferably, the alkaline metal salt is added to the aqueous solution of metal salt. The organic complexing ligand can be added to either the aqueous solution of metal salt or to the aqueous solution of metal cyanide salt or to both solutions or to the mixture after the two solutions are combined or it can be added after formation of the precipitate. The functionalized polymer can be added to either the aqueous solution of metal salt or to the aqueous solution of metal cyanide salt or to both solutions or to the mixture after the two solutions are combined or it can be added after formation of the precipitate.

The reactants are mixed using any of the mixing methods known in the art, such as, for example, by simple mixing, high-shear mixing or homogenization. Preferably, the reactants are combined with simple mixing at a temperature within the range of from about room temperature to about 80° C. A precipitate forms when the reactants are mixed.

The resulting precipitate is isolated from suspension by known techniques such as, for example, by centrifugation, filtration, filtration under pressure, decanting, phase separation or aqueous separation.

The isolated precipitate is preferably washed at least once with water and/or with a mixture which is preferably composed of water and at least one organic complexing ligand. More preferably, this mixture is composed of water, at least one organic complexing ligand and at least one alkaline metal salt. Most preferably, this mixture is composed of water, at least one organic complexing ligand, at least one alkaline metal salt and at least one functionalized polymer.

Preferably, the isolated precipitate is filtered from the wash mixture by known techniques such as, for example, centrifugation, filtration, filtration under pressure, decanting, phase separation or aqueous separation. The filtered precipitate is preferably washed at least once with a mixture which is preferably composed of at least one organic complexing ligand. More preferably, this mixture is composed of water, at least one organic complexing ligand and at least one alkaline metal salt. Most preferably, this mixture is composed of water, at least one organic complexing ligand, at least one alkaline metal salt and at least one functionalized polymer.

The present invention is also directed to a process for preparing a polyol in the presence of a DMC catalyst of or prepared according to the present invention.

Any starter compound which has active hydrogen atoms can be used in the present invention. Starter compounds which are useful in the present invention include compounds having number average molecular weights between 18 to 2,000, preferably, between 32 to 2,000, and which have from 1 to 8 hydroxyl groups. Examples of starter compounds which can be used in the present invention include, for example, polyoxypropylene polyols, polyoxyethylene polyols, polytetatramethylene ether glycols, glycerol, propoxylated glycerols, tripropylene glycol, alkoxylated allylic alcohols, bisphenol A, pentaerythritol, sorbitol, sucrose, degraded starch, water and mixtures thereof.

Monomers or polymers which will copolymerize with an oxide in the presence of a DMC catalyst can be included in the process of the present invention to produce various types of polyols. The build-up of the polymer chains by alkoxylation can be accomplished randomly or blockwise. Additionally, any copolymer known in the art made using a conventional DMC catalyst can be made with the DMC catalyst prepared according to the process of the present invention.

Any alkylene oxide can be used in the present invention. Alkylene oxides preferably used in the present invention include, for example, ethylene oxide, propylene oxide, butylene oxide and mixtures thereof.

Oxyalkylation of the starter compound can be accomplished by any of the methods known in the art, such as, for example, in a batch, semi-batch or continuous process. Oxyalkylation is carried out at a temperature in the range of from about 20 and 200° C., preferably, from about 40 and 180° C., more preferably, from about 50 and 150° C. and under an overall pressure of from about 0.0001 to about 20 bar. The amount of DMC catalyst used in the oxyalkylation reaction is chosen such that sufficient control of the reaction is possible under the given reaction conditions. The DMC catalyst concentration of an oxyalkylation reaction is typically in the range of from about 0.0005 wt. % to about 1 wt. %, preferably, from about 0 0.001 wt. % to about 0.1 wt. %, more preferably, from about 0.001 to about 0.0025 wt. %, based on the total weight of polyol to be prepared.

The number average molecular weight of the polyol prepared by the process of the present invention is in the range of from about 500 to about 100,000 g/mol, preferably, from about 1,000 to about 12,000 g/mol, more preferably, from about 2,000 to about 8,000 g/mol. Polyols prepared by the process of the present invention have average hydroxyl functionalities of from about 1 to 8, preferably, from about 2 to 6, and more preferably, from about 2 to 3.

DMC catalysts of the present invention can be used to produce polyols which have reduced levels of high molecular weight tail (greater than 400 K). The amount of high molecular weight tail is quantified by any suitable method. A particularly convenient way to measure the amount of high molecular weight tail is by gel permeation chromatography (GPC). A suitable technique for measuring high molecular weight tail is described below as well as in, for example, U.S. Pat. No. 6,013,596.

The following examples merely illustrate the invention. Those skilled in the art will recognize many variations that are within the spirit of the invention and scope of the claims.

EXAMPLES

A DMC catalyst which was prepared according to any one of Examples 1–16 set forth below was used to prepare a 6000 MW polyoxypropylene triol by adding propylene oxide over 4 hours to an activated mixture composed of the DMC and a propoxylated glycerin starter (hydroxyl number=240 mg KOH/g). Catalyst levels of 30 ppm were used. The hydroxyl number, viscosity and unsaturation of each product were measured by standard methods. A gel permeation chromatography (GPC) technique as described in U.S. Pat. No. 6,013,596, the teachings of which are incorporated herein by reference, was used to measure the amount of polyol component having a number average molecular weight (Mn) from 40,000 to >400,000. The amount present (in ppm) is recorded and the percent of high molecular weight (HMW) tail reduction of the catalyst for each range of molecular weight is calculated using the following formula (hereinafter referred to as "Formula I"):

% Reduction*=(HMW tail of comparative example−HMW tail of polyol prepared with a DMC catalyst of the present invention)×100%/HMW tail of comparative control

* no reduction of HMW tail is obtained if the % reduction is less than zero.

Example 1
Preparation of a DMC Catalyst Using Sodium Chloride and a Polyoxypropylene Diol:

An aqueous zinc chloride solution (120 g. of 62.5 wt. % $ZnCl_2$) was diluted with deionized water (230 g.) and tert-butyl alcohol (38 g.) in a one-liter stirred reactor (Solution 1). Potassium hexacyanocobaltate (7.5 g.) and sodium chloride (4 g.) were dissolved in a 500-ml beaker with deionized water (100 g) and tert-butyl alcohol (15.5 g.) (Solution 2). Solution 3 was prepared by dissolving a 1000 mol. wt. polyoxypropylene diol (8 g.) in deionized water (50 g.) and tert-butyl alcohol (2 g.). Solution 2 was added to Solution 1 over 45 min. while mixing at 1,500 rpm. The reaction temperature was kept at 50° C. during the course of the reaction by using an internal coil for heating or cooling. Following the addition, mixing continued at 1,500 rpm for 20 min. The mixing was stopped. Solution 3 was then added, followed by slow stirring for 3 min.

The reaction mixture was filtered at 40 psig through a $0.45\mu$ nylon membrane. The catalyst cake was re-slurried in a mixture of tert-butyl alcohol (100 g.), deionized water (55 g) and sodium chloride (2 g) and mixed at 1,500 rpm for 20 min. The mixing was stopped. 1000 mol. wt. polyoxypropylene diol (2 g.) was added and the mixture was stirred slowly for 3 min. The catalyst was filtered as described above. The cake was re-slurried in tert-butyl alcohol (144 g.) and mixed as described above. 1000 mol. wt. polyoxypropylene diol (1 g.) was added and the product was filtered as described above. The resulting catalyst residue was dried in a vacuum oven at 60° C., 30 in. (Hg) to constant weight.

Elemental analysis: Cobalt=9 wt. %; Zinc=21.7 wt. %; Sodium=0.75 wt. %; Cl=6.1 wt. %

Example 2
Preparation of a DMC Catalyst Using Lithium Chloride and a Polyoxypropylene Diol:

An aqueous zinc chloride solution (120 g. of 62.5 wt. % $ZnCl_2$) was diluted with deionized water (230 g.) and tert-butyl alcohol (38 g.) in a one-liter stirred reactor. Lithium chloride (0.3 g.) was added to this solution (Solution 1). Potassium hexacyanocobaltate (7.5 g.) was dissolved in a 500-ml beaker with deionized water (100 g.) and tert-butyl alcohol (15.5 g.) (Solution 2). Solution 3 was prepared by dissolving a 1000 mol. wt. polyoxypropylene diol (8 g.) in deionized water (50 g.) and tert-butyl alcohol (2 g.). Solution 2 was added to Solution 1 over 45 min. while mixing at 1,500 rpm. The reaction temperature was kept at 50° C. during the course of the reaction by using an internal coil for heating or cooling. Following the addition, mixing continued at 1,500 rpm for 20 min. The mixing was stopped. Solution 3 was added, followed by slow stirring for 3 min.

The reaction mixture was filtered at 40 psig through a $0.45\mu$ nylon membrane. The catalyst cake was re-slurried in a mixture of tert-butyl alcohol (100 g.), deionized water (55 g.) and lithium chloride (2 g.) and mixed at 1,500 rpm for 20 min. The mixing was stopped. 1000 mol. wt. polyoxypropylene diol (2 g.) was added and the mixture was stirred slowly for 3 min. The catalyst was filtered as described above. The cake was re-slurried in tert-butyl alcohol (144 g.) and lithium chloride (0.5 g.) and mixed as described above. 1000 mol. wt. polyoxypropylene diol (1 g.) was added and the product was filtered as described above. The resulting catalyst residue was dried in a vacuum oven at 60° C., 30 in. (Hg) to constant weight.

Elemental analysis: Cobalt=9.1 wt. %; Zinc=21.9 wt. %; Lithium=0.15 wt. %; Cl=4.8 wt. %

Example 3
Preparation of a DMC Catalyst Using Sodium Bromide and a Polyoxypropylene Diol:

The procedure of Example 2 was followed, except that NaBr was used in lieu of LiCl.

Elemental analysis: Cobalt=8.1 wt. %; Zinc=21.9 wt. %; Sodium=0.48 wt. %; Cl=3.8 wt. %; Br=3.8 wt. %

Example 4
Preparation of a DMC Catalyst Using Lithium Bromide and a Polyoxypropylene Diol:

An aqueous zinc chloride solution (120 g. of 62.5 wt. % $ZnCl_2$) was diluted with deionized water (230 g.) and tert-butyl alcohol (38 g.) in a one-liter stirred reactor. Lithium bromide (4 g.) was added to this solution (Solution 1). Potassium hexacyanocobaltate (7.5 g.) was dissolved in a 500-ml beaker with deionized water (100 g.) and tert-butyl alcohol (15.5 g.) (Solution 2). Solution 3 was prepared by dissolving a 1000 mol. wt. polyoxypropylene diol (8 g.) in deionized water (50 g.) and tert-butyl alcohol (2 g.). Solution 2 was added to Solution 1 over 45 min. while mixing at 1,500 rpm. The reaction temperature was kept at 50° C. during the course of the reaction by using an internal coil for heating or cooling. Following the addition, mixing continued at 1,500 rpm for 20 min. The mixing was stopped. Solution 3 was added, followed by slow stirring for 3 min.

The reaction mixture was filtered at 40 psig through a $0.45\mu$ nylon membrane. The catalyst cake was re-slurried in a mixture of tert-butyl alcohol (100 g.) and deionized water (55 g) and mixed at 1,500 rpm for 20 min. The mixing was stopped. 1000 mol. wt. polyoxypropylene diol (2 g.) was added and the mixture was stirred slowly for 3 min. The catalyst was filtered as described above. The cake was re-slurried in tert-butyl alcohol (144 g.) and mixed as described above. 1000 mol. wt. polyoxypropylene diol (1 g.) was added and the product was filtered as described above. The resulting catalyst residue was dried in a vacuum oven at 60° C., 30 in. (Hg) to constant weight.

Elemental Analysis Zn=23.4 wt. %; Co=10.8 wt. %; Li=<0.02 wt. %; Br: 0.4 wt. %; Cl=3.6 wt. %

Example 5
Preparation of a DMC Catalyst Using Sodium Chloride and a Diol of Propylene Oxide and Ethylene Oxide Copolymer:

An aqueous zinc chloride solution (120 g. of 62.5 wt. % $ZnCl_2$) was diluted with deionized water (230 g.) and tert-butyl alcohol (38 g.) in a one-liter stirred reactor. Sodium chloride (0.3 g.) was added to this solution (Solution 1). Potassium hexacyanocobaltate (7.5 g.) was dissolved in a 500-ml beaker with deionized water (100 g.) and tert-butyl alcohol (15.5 g.) (Solution 2). Solution 3 was prepared by dissolving 8 g. of a 4000 mol. wt. diol of propylene oxide and ethylene oxide copolymer (80:20 wt. ratio) in deionized water (50 g.) and tert-butyl alcohol (2 g.). Solution 2 was added to Solution 1 over 45 min. while mixing at 900 rpm. The reaction temperature was kept at 50° C. during the course of the reaction by using an internal coil for heating or cooling. Following the addition, mixing continued at 900 rpm for 20 min. The mixing was stopped. Solution 3 was added, followed by slow stirring for 3 min.

The reaction mixture was filtered at 40 psig through a $0.45\mu$ nylon membrane. The catalyst cake was re-slurried in a mixture of tert-butyl alcohol (100 g.), deionized water (55 g.) and sodium chloride (2 g.) and mixed at 900 rpm for 20 min. The mixing was stopped. 4000 mol. wt. diol (2 g.) was added and the mixture was stirred slowly for 3 min. The catalyst was filtered as described above. The cake was re-slurried in tert-butyl alcohol (144 g.) and sodium chloride (1 g.) and mixed as described above. 4000 mol. wt. diol (1 g.) was added and the product was filtered as described above. The resulting catalyst residue was dried in a vacuum oven at 60° C., 30 in. (Hg) to constant weight.

Elemental analysis: Cobalt=8.8 wt. %; Zinc=20.3 wt. %; Sodium=2.4 wt. %

Example 6
Preparation of a DMC Catalyst Using Potassium Chloride and a Polyoxypropylene Diol:

An aqueous zinc chloride solution (120 g. of 62.5 wt. % $ZnCl_2$) was diluted with deionized water (230 g.) and tert-butyl alcohol (38 g.) in a one-liter stirred reactor (Solution 1). Potassium hexacyanocobaltate (7.5 g.) and potassium chloride (4.0 g) were dissolved in a 500-ml beaker with deionized water (100 g.) and tert-butyl alcohol (15.5 g.) (Solution 2). Solution 3 was prepared by dissolving 8 g. of a 1000 mol. wt. polyoxypropylene diol (8 g.) in deionized water (50 g.) and tert-butyl alcohol (2 g.). Solution 2 was added to Solution 1 over 45 min. while mixing at 500 rpm. The reaction temperature was kept at 50° C. during the course of the reaction by using an internal coil for heating or cooling. Following the addition, mixing continued at .500 rpm for 20 min. The mixing was stopped. Solution 3 was added, followed by slow stirring for 3 min.

The reaction mixture was filtered at 40 psig through a $0.45\mu$ nylon membrane. The catalyst cake was re-slurried in a mixture of tert-butyl alcohol (100 g.), deionized water (55 g.) and mixed at 500 rpm for 20 min. The mixing was stopped. 1000 mol. wt. diol (2 g.) and potassium chloride (2 g) were added and the mixture was stirred slowly for 3 min. The catalyst was isolated as described above. The cake was re-slurried in tert-butyl alcohol (125 g) and deionized water (30 g) and was mixed at 500 rpm for 20 min. The mixing was stopped. 1000 mol. wt. diol (2 g) and potassium chloride (2 g) were added and the mixture was stirred slowly for 3 min. The catalyst was filtered as described above. The cake was re-slurried in tert-butyl alcohol (144 g.) and mixed as described above. 1000 mol. wt. diol (1 g.) was added and the product was filtered as described above. The resulting catalyst residue was dried in a vacuum oven at 60° C., 30 in. (Hg) to constant weight.

Elemental analysis: Co=9.4 wt. %; Zn=20 wt. %; K=6.1 wt. %.

Example 7
Preparation of a DMC Catalyst Using Potassium Chloride, a Polyoxypropylene Diol and a Poly(Styrene-alt-maleic Acid, Sodium Salt) (30 wt % in Water):

An aqueous zinc chloride solution (120 g. of 62.5 wt. % $ZnCl_2$) was diluted with deionized water (230 g.) and tert-butyl alcohol (38 g.) in a one-liter stirred reactor (Solution 1). Potassium hexacyanocobaltate (7.5 g.) and potassium chloride (4.0 g.) were dissolved in a 500-ml beaker with deionized water (100 g.) and tert-butyl alcohol (15.5 g.) (Solution 2). Solution 3 was prepared by dissolving 8 g. of a 1000 mol. wt. polyoxypropylene diol in deionized water (50 g.) and tert-butyl alcohol (2 g.). Solution 2 was added to Solution 1 over 45 min. while mixing at 500 rpm. The reaction temperature was kept at 500C during the course of the reaction by using an internal coil for heating or cooling. Following the addition, mixing continued at 500 rpm for 20 min. The mixing was stopped. Solution 3 was added, followed by slow stirring for 3 min.

The reaction mixture was filtered at 40 psig through a $0.45\mu$ nylon membrane. The catalyst cake was re-slurried in a mixture of potassium chloride (2 g.), tert-butyl alcohol (100 g.), poly(styrene-alt-maleic acid, sodium salt) solution (7 g.) and deionized water (55 g.) and mixed at 800 rpm for 20 min. The mixing was stopped. 1000 mol. wt. diol (2 g.) was added and the mixture was stirred slowly for 3 min. The catalyst was isolated as described above. The cake was re-slurried in tert-butyl alcohol (144 g.) and mixed as described above. More 1000 mol. wt. diol (1 g.) was added and the product was filtered as described above. The resulting catalyst residue was dried in a vacuum oven at 60°C., 30 in. (Hg) to constant weight.

Elemental analysis: Co=10.1 wt. %; Zn=22.4 wt. %; K=1.86 wt. %.

Example 8

Preparation of a DMC Catalyst Using Potassium Chloride, a Polyoxypropylene Diol and a Poly(Methacrylic Acid, Sodium Salt) (30 wt % Solution in Water):

The procedure of Example 7 was followed, except that poly(methacrylic acid, sodium salt) (30 wt % solution in water) was used in lieu of poly(styrene-alt-maleic acid, sodium salt) (30 wt % solution in water).

Elemental analysis: Co=8 wt. %; Zn=21.6 wt. %; K=4.3 wt. %.

Example 9

Preparation of a DMC Catalyst Using Sodium Chloride but No Functionalized Polymer:

An aqueous zinc chloride solution (120 g. of 62.5 wt. % $ZnCl_2$) was diluted with deionized water (230 g.) and tert-butyl alcohol (38 g.) in a one-liter stirred reactor. Sodium chloride (0.3 g.) was added to this solution (Solution 1). Potassium hexacyanocobaltate (7.5 g.) was dissolved in a 500-ml beaker with deionized water (100 g.) and tert-butyl alcohol (15.5 g.) (Solution 2). Solution 2 was added to Solution 1 over 45 min. while mixing at 800 rpm. The reaction temperature was kept at 50° C. during the course of the reaction by using an internal coil for heating or cooling. Following the addition, mixing continued at 800 rpm for 20 min. The mixing was stopped.

The reaction mixture was filtered at 40 psig through a $0.65\mu$ nylon membrane. The catalyst cake was re-slurried in a mixture of tert-butyl alcohol (100 g.), deionized water (55 g.) and sodium chloride (2 g.) and mixed at 800 rpm for 20 min. The mixing was stopped. The catalyst was isolated as described above. The cake was re-slurried in tert-butyl alcohol (144 g.) and sodium chloride and mixed as described above. The product was isolated as described above. The resulting catalyst residue was dried in a vacuum oven at 60° C., 30 in. (Hg) to constant weight.

Elemental Analysis: Zn=25.9 wt. %; Co=12 wt. %; Na=1.29 wt. %.

Example 10 (Comparative)
Preparation of a DMC Catalyst Using a Functionalized Polymer but No Salt:

The procedure of Example 1 was followed, except that no NaCl was added.

Elemental analysis: Cobalt=9 wt. %; Zinc=21.6 wt. %; Cl=4.1 wt. %

Examples 11, 12 and 13 (all Comparative)
Preparation of a DMC Catalyst Using a Functionalized Polymer but No Salt:

For Comparative Examples 11, 12 and 13, DMC catalysts were prepared according to the procedure of Example 1, except that no NaCl was added.

Elemental analysis: Cobalt=10.3 wt. %; Zinc=23.2 wt. %; Cl=4.0 wt. %; K=0.21 wt. %

Example 14 (Comparative)
Preparation of a DMC Catalyst Using No Functionalized Polymer and No Salt:

An aqueous zinc chloride solution (120 g. of 62.5 wt. % $ZnCl_2$) was diluted with deionized water (230 g.) and tert-butyl alcohol (38 g.) in a one-liter stirred reactor (Solution 1). Potassium hexacyanocobaltate (7.5 g.) was dissolved in a 500-ml beaker with deionized water (100 g.) and tert-butyl alcohol (15.5 g.) (Solution 2). Solution 2 was added to Solution I over 45 min. while mixing at 800 rpm. The reaction temperature was kept at 50° C. during the course of the reaction by using an internal coil for heating or cooling. Following the addition, mixing continued at 800 rpm for 20 min. The mixing was stopped.

The reaction mixture was filtered at 40 psig through a 0.65μ nylon membrane. The catalyst cake was re-slurried in a mixture of tert-butyl alcohol (100 g.), deionized water (55 g.) and mixed at 800 rpm for 20 min. The mixing was stopped. The catalyst was isolated as described above. The cake was re-slurried in tert-butyl alcohol (144 g.) and mixed as described above. The product was isolated as described above.

The resulting catalyst residue was dried in a vacuum oven at 60° C., 30 in. (Hg) to constant weight.

Elemental Analysis: Co=12.4 wt. %; Zn=26.8 wt. %.

Example 15
Preparation of a DMC Catalyst Using Sodium Chloride and a Block Copolymer of NEODOL-$(EO)_m$-IBO:

The procedure of Example 5 was followed except that a block copolymer of NEODOL-$(EO)_m$-IBO was used in lieu of the 1000 mol. wt. diol. The block copolymer was prepared using NEODOL (which is available commercially from Shell Chemical Company) as a starter and a DMC catalyst prepared essentially by the method of U.S. Pat. No. 5,482,908 (the teachings of which are incorporated herein by reference) to produce a polyoxyethylene having a molecular weight of about 1000. This di-blockcopolymer was end-capped by 1–2 units of isobutylene oxide.

Example 16 (Comparative)
Preparation of a DMC Catalyst Using Zinc Hexacyanocobaltate/t-butyl Alcohol and a Polyoxypropylene Diol:

The procedure of Example 1 was followed, except that no NaCl was added.

Elemental analysis: Cobalt=9 wt. %; Zinc=21.6 wt. %

As illustrated in Table 1, DMC catalysts prepared according to the process of the present invention, such as those prepared in Examples 1–5, (prepared with an alkaline metal salt and a functionalized polymer), can be used to produce polyols which have an acceptable amount of high molecular weight tail.

TABLE 1

| | Catalyst of Ex # | | | | | |
|---|---|---|---|---|---|---|
| | 10* | 1 | 2 | 3 | 4 | 5 |
| Additive | None | NaCl | LiCl | NaBr | LiBr | NaCl |
| Na or Li in Catalyst [wt. %] | None | 0.75 (Na) | 0.15 (Li) | 0.48 (Na) | <0.02 (Li) | 2.4 (Na) |
| Polymerization Rate [Kg.PO/g.Co/min.] | 21.7 | 16.4 | 19.1 | 23.7 | 20.7 | 16.1 |
| 6000 MW Triol: | | | | | | |
| OH# [mg KOH/g] | 29.7 | 28.4 | 30.6 | 29.8 | 30.3 | 29.7 |
| Viscosity [cps] | 1105 | 1120 | 1087 | 1156 | 1054 | 1130 |
| Unsaturation [meq/g] | 0.005 | 0.0055 | 0.0048 | 0.0056 | 0.0046 | 0.0064 |
| HMW Tail: | | | | | | |
| (MW) | (ppm) | (ppm) | (ppm) | (ppm) | (ppm) | (ppm) |
| 40–60 K | 855 | 616 | 609 | 558 | 724 | 672 |
| 60–80 K | 465 | 316 | 330 | 250 | 409 | 344 |
| 80–100 K | 287 | 190 | 206 | 118 | 248 | 203 |
| 100–200 K | 337 | 235 | 249 | 229 | 318 | 261 |
| 200–400 K | 120 | 94 | 99 | 99 | 119 | 91 |
| >400 K | 40 | 30 | 37 | 40 | 48 | 21 |

6000 MW Triol prepared at 130° C., 4 hour-PO addition with 30 ppm of catalyst based on the amount of polyol made.
HMW tail based on six portion-cut GPC.
*Comparative Elemental Analysis: Zn=25.9 wt. %; Co=12 wt. %; Na=1.29 wt. %.

As illustrated in Table 2, DMC catalysts prepared according to the process of the present invention, such as those prepared in Examples 1–5, (prepared with an alkaline metal salt and a functionalized polymer), can be used to produce polyols which have a reduced amount of high molecular weight tail compared to a polyol produced in the presence of a DMC catalyst which is prepared with a functionalized polymer but no alkaline metal salt. Such as the one prepared in Comparative Example 10. The percent reduction of high molecular weight tail was determined by Formula 1.

TABLE 2

|  | Catalyst of Ex # | | | | |
| --- | --- | --- | --- | --- | --- |
|  | 1 | 2 | 3 | 4 | 5 |
| Additive | NaCl | LiCl | NaBr | LiBr | NaCl |
| Na or Li in Catalyst [wt. %] | 0.75 (Na) | 0.15 (Li) | 0.48 (Na) | <0.02 (Li) | 2.4 (Na) |
| 6000 MW Triol: | | | | | |
| OH# [mg KOH/g] | 28.4 | 30.6 | 29.8 | 30.3 | 29.7 |
| Viscosity [cps] | 1120 | 1087 | 1156 | 1054 | 1130 |
| Unsaturation [meq/g] | 0.0055 | 0.0048 | 0.0056 | 0.0046 | 0.0064 |
| HMW Tail: | | | | | |
| (MW) | % Reduction | % Reduction | % Reduction | % Reduction | % Reduction |
| 40–60 K | 28 | 29 | 35 | 15 | 21 |
| 60–80 K | 32 | 29 | 46 | 12 | 26 |
| 80–100 K | 34 | 28 | 59 | 14 | 29 |
| 100–200 K | 30 | 26 | 32 | 6 | 23 |
| 200–400 K | 22 | 18 | 18 | 1 | 24 |
| >400 K | 25 | 8 | 0 | −20 | 48 |

6000 MW Triol prepared at 130° C., 4 hour-PO addition with 30 ppm of catalyst based on the amount of polyol made
HMW tail based on six portion-cut GPC.

As illustrated in Table 3, DMC catalysts prepared according to the process of the present invention, such as the one prepared in Example 6 (prepared with an alkaline metal salt and a functionalized polymer), can be used to produce a polyol having a reduced amount of high molecular weight tail compared to a polyol produced in the presence of a DMC catalyst which is prepared with a functionalized polymer but no alkaline metal salt, such as the one prepared in Comparative Example 11. The percent reduction of high molecular weight tail was determined by Formula I.

TABLE 3

|  | Catalyst of Ex # | | |
| --- | --- | --- | --- |
|  | 11* | 6 | 6 |
| Additive | None | KCl | KCl |
| Potassium in catalyst [wt. %] | 0.21 | 6.1 | 6.1 |
| 6000 MW Triol: | | | |
| OH# [mg KOH/g] | 29.5 | 29.9 | 29.9 |
| Viscosity [cps] | 1109 | 1131 | 1131 |
| Unsaturation [meq/g] | 0.006 | 0.0076 | 0.0076 |

TABLE 3-continued

|  | Catalyst of Ex # | | |
| --- | --- | --- | --- |
|  | 11* | 6 | 6 |
| HMW Tail: | | | |
| (MW) | (ppm) | (ppm) | (% Reduction) |
| 40–50.4 K | 1169 | 608 | 48 |
| 50.4–63.4 K | 920 | 448 | 51 |
| 63.4–79.8 K | 719 | 366 | 49 |
| 79.8–100.5 K | 564 | 332 | 41 |
| 100.5–126.5 K | 430 | 247 | 43 |
| 126.5–159.2 K | 245 | 126 | 49 |
| 159.2–200.5 K | 164 | 82 | 50 |
| 200.5–252.4 K | 108 | 50 | 54 |
| 252.4–317.7 K | 69 | 29 | 58 |
| 317.7–400 K | 48 | 16 | 67 |
| >400 K | 33 | 0 | 100 |

6000 MW Triol prepared at 130° C., 4-hour-PO addition with 30 ppm of catalyst based on the amount of polyol
HMW tail based on ten portion-cut GPC.
*Comparative As illustrated in Table 4, DMC catalysts prepared according to the process of the present invention, such as the one prepared in Example 7 (prepared with an alkaline metal salt and a functionalized polymer), can be used to produce a polyol having a reduced amount of high molecular weight tail compared to a polyol produced in the presence of a DMC catalyst which is prepared with a functionalized polymer but no alkaline metal salt, such as the one prepared in Comparative Example 12. The percent reduction of high molecular weight tail was determined by Formula I.

TABLE 4

| | Catalyst of Ex # | | |
|---|---|---|---|
| | 12* | 7 | 7 |
| Additive | None | KCl | KCl |
| Potassium in catalyst [wt. %] | 0.21 | 1.86 | 1.86 |
| 6000 MW Triol: | | | |
| OH# [mg KOH/g] | 29.2 | 29.5 | 29.5 |
| viscosity [cps] | 1113 | 1093 | 1093 |
| Unsaturation [meq/g] | 0.0055 | 0.0061 | 0.0061 |
| HMW Tail: | | | |
| (MW) | (ppm) | (ppm) | (% Reduction) |
| 40–50.4 K | 1115 | 649 | 42 |
| 50.4–63.4 K | 869 | 479 | 45 |
| 63.4–79.8 K | 760 | 421 | 45 |
| 79.8–100.5 K | 603 | 356 | 41 |
| 100.5–126.5 K | 457 | 267 | 42 |
| 126.5–159.2 K | 286 | 156 | 46 |
| 159.2–200.5 K | 203 | 112 | 45 |
| 200.5–252.4 K | 131 | 74 | 44 |
| 252.4–317.7 K | 93 | 52 | 44 |
| 317.7–400 K | 58 | 33 | 43 |
| >400 K | 41 | 23 | 44 |

6000 MW Triol prepared at 130° C., 4 hour-PO addition with 30 ppm of catalyst base on the am ount of polyol made.
HMW tail based on ten portion-cut GPC.
*Comparative As illustrated in Table 5, DMC catalysts prepared according to the process of the present invention, such as the one prepared in Example 8 (prepared with an alkaline metal salt and a functionalized polymer), can be used to produce a polyol having a reduced amount of high molecular weight tail compared to a polyol produced in the presence of a DMC catalyst which is prepared with a functionalized polymer but no alkaline metal salt, such as the one prepared in Comparative Example 13. The percent reduction of high molecular weight tail was determined by Formula I.

TABLE 5

| | Catalyst of Ex # | | |
|---|---|---|---|
| | 13* | 8 | 8 |
| Additive | None | KCl | KCl |
| Potassium in catalyst [wt. %] | 0.21 | 4.3 | 4.3 |
| 6000 MW Triol: | | | |
| OH# [mg KOH/g] | 29.8 | 29.6 | 29.6 |
| viscosity [cps] | 1112 | 1108 | 1108 |
| Unsaturation [meq/g] | 0.0055 | 0.0061 | 0.0061 |
| HMW Tail: | | | |
| (MW) | | | % Reduction |
| 40–50.4 K | 1290 | 685 | 47 |
| 50.4–63.4 K | 1031 | 476 | 54 |
| 63.4–79.8 K | 8i5 | 403 | 51 |
| 79.8–100.5 K | 641 | 350 | 45 |
| 100.5–126.5 K | 473 | 277 | 41 |
| 126.5–159.2 K | 266 | 159 | 40 |
| 159.2–200.5 K | 177 | 94 | 47 |
| 200.5–252.4 K | 109 | 55 | 50 |

TABLE 5-continued

| | Catalyst of Ex # | | |
|---|---|---|---|
| | 13* | 8 | 8 |
| 317.7–400 K | 47 | 0 | 100 |
| 252.4–317.7 K | 75 | 19 | 75 |
| >400 K | 22 | 0 | 100 |

6000 MW Triol prepared at 130° C. 4 hour-PO addition with 30 ppm of catalyst based on the amount of polyol made.
HMW tail based on ten portion-cut GPC.
*Comparative As illustrated in Table 6, DMC catalysts prepared according to the process of the present invention, such as the one prepared in Example 9 (prepared with an alkaline metal salt but no functionalized polymer), can be used to produce a polyol having a reduced amount of high molecular weight tail compared to a polyol produced in the presence of a DMC catalyst which is prepared without a functionalized polyol and alkaline metal salt, such as the one prepared in Comparative Example 14. The percent reduction of high molecular weight tail was determined by Formula I.

TABLE 6

| | Catalyst of Ex # | | |
|---|---|---|---|
| | 14* | 9 | 9 |
| Additive | None | NaCl | NaCl |
| Sodium in catalyst [wt. %] | None | 1.29 | 1.29 |
| Polymerization Rate [Kg.PO/g.Co/min.] | 14.3 | 12.9 | 12.9 |
| 6000 MW Triol: | | | |
| OH# [mg KOH/g] | 29.4 | 29.2 | 29.2 |
| Viscosity [cps] | 1169 | 1198 | 1198 |
| Unsaturation [meq/g] | 0.0043 | 0.0049 | 0.0049 |
| HMW Tail: | | | |
| (MW) | (ppm) | (ppm) | (% Reduction) |
| 40–60 K | 1680 | 1412 | 16 |
| 60–80 K | 906 | 745 | 18 |
| 80–100 K | 537 | 436 | 19 |
| 100–200 K | 591 | 476 | 19 |
| 200–400 K | 196 | 175 | 11 |
| >400 K | 63 | 64 | −2 |

6000 MW Triol prepared at 130° C., 4 hour-PO addition with 30 ppm of catalyst based on the amount of polyol made.
HMW tail based on six portion-cut GPC.
*Comparative As illustrated in Table 7, DMC catalysts prepared according to the process of the present invention, such as the one prepared in Example 15 (prepared with an alkaline metal salt and a functionalized polymer), can be used to produce a polyol having a reduced amount of high molecular weight tail compared to a polyol produced in the presence of a DMC catalyst which is prepared with a functionalized polymer but no alkaline metal salt, such as the one prepared in Comparative Example 16. The percent reduction of high molecular weight tail was determined by Formula I.

TABLE 7

| | Catalyst of Ex | | |
|---|---|---|---|
| | 16 (Comparative) | 15 | 15 |
| Additive | None | NaCl | NaCl |
| Na in Catalyst [wt. %] | None | 0.88 | 0.88 |
| 6000 MW | | | |
| OH# [mg OH/g] | 29.8 | 30 | 30 |
| Viscosity [cps] | 1095 | 1137 | 1137 |
| Unsaturation [meq/g] | 0.0052 | 0.0051 | 0.0051 |
| HMW Tail: | | | |
| (MW) | (ppm) | (ppm) | % Reduction |
| 40–60 K | 1064 | 574 | 46 |
| 60–80 K | 581 | 281 | 52 |
| 80–100 K | 352 | 154 | 56 |
| 100–200 K | 382 | 199 | 48 |
| 200–400 K | 123 | 80 | 35 |
| >400 K | 41 | 23 | 44 |

6000 MW Triol prepared at 130° C., 4-hour PO addition with 30 ppm catalyst based on the amount of poiyoi made.
HMW tail based on six portion cut GPC

What is claimed is:

1. A double-metal cyanide catalyst prepared by
combining
at least one metal salt,
at least one metal cyanide salt,
at least one organic complexing ligand,
at least one alkali metal salt, and
optionally, at least one functionalized polymer,
under conditions sufficient to form a catalyst; and
adding the at least one alkali metal salt to the catalyst so formed in an amount such that the catalyst includes the at least one alkali metal salt in an amount of from about 0.4 to about 6 wt. % based on the total weight of the catalyst.

2. The double metal cyanide catalyst of claim 1, wherein the at least one metal salt is selected from the group consisting of zinc chloride, zinc bromide, zinc acetate, zinc acetylacetonate, zinc benzoate, zinc nitrate, zinc propionate, zinc formate, iron(II) sulfate, iron(II) bromide, cobalt(II) chloride, cobalt(II) thiocyanate, nickel(II) formate, nickel (II) nitrate and mixtures thereof.

3. The double metal cyanide catalyst of claim 1, wherein the at least one metal cyanide salt is selected from the group consisting of potassium hexacyanocobaltate (III), potassium hexacyanoferrate(II), potassium hexacyanoferrate(III), lithium hexacyanoiridate(III), lithium hexacyanocobaltate (III), sodium hexacyanocobaltate(III) and cesium hexacyanocobaltate(III).

4. The double metal cyanide catalyst of claim 1, wherein the at least one organic complexing ligand is selected from the group consisting of ethanol, isopropanol, n-butanol, iso-butanol, sec-butanol and tert-butyl alcohol.

5. The double metal cyanide catalyst of claim 1, wherein the at least one alkali metal salt is selected from the group consisting of potassium chloride, sodium chloride, sodium bromide, lithium chloride and lithium bromide.

6. The double metal cyanide catalyst of claim 1, wherein the at least one functionalized polymer is present In an amount in the range of from about 2 to about 98 wt. %, based on the total weight of the double-metal cyanide catalyst.

7. The double metal cyanide catalyst of claim 1, wherein the at least one functionalized polymer is a polyether: polyester; polycarbonate; polyalkylene glycol sorbitan ester; polyalkylene glycol glycidyl ether; polyacrylamide; poly (acrylamide-co-acrylic acid), polyacrylic acid, poly(acrylic acid-co-maleic acid), poly(N-vinylpyrrolidone-co-acrylic acid), poly(acrylic acid-co-styrene) or their salts; maleic acid, styrene or maleic anhydride copolymers or their salts; polyacrylonitriles; polyalkyl acrylate; polyalkyl methacrylate; polyvinyl methyl ether; polyvinyl ethyl ether; polyvinyl acetate; polyvinyl alcohol; poly-N-vinylpyrrolidone; polyvinyl methyl ketone; poly(4-vinylphenol) oxazoline polymer; polyalkyleneimine; hydroxyethylcellulose; polyacetal; glycidyl ether; glycoside; carboxylic acid ester of polyhydric alcohol; bile acid or its salt, ester or amide; cyclodextrin; phosphorus compound; unsaturated carboxylic acid ester; or an ionic surface or interface-active compound.

8. A process for preparing a double-metal cyanide catalyst comprising:
combining
at least one metal salt;
at least one metal cyanide salt;
at least one organic complexing ligand;
at least one alkali metal salt; and
optionally, at least one functionalized polymer;
under conditions sufficient to form a catalyst; and
adding at least one alkali metal salt to the catalyst so formed in an amount such that the catalyst includes the at least one alkali metal salt in an amount of from about 0.4 to about 6 wt. % based on the total weight of the catalyst.

9. The process of claim 8, wherein the at least one metal salt is selected from the group consisting of zinc chloride, zinc bromide, zinc acetate, zinc acetylacetonate, zinc benzoate, zinc nitrate, zinc propionate, zinc formate, iron(II) sulfate, iron(II) bromide, cobalt(II) chloride, cobalt(II) thiocyanate, nickel(II) formate, nickel(II) nitrate and mixtures thereof.

10. The process of claim 8, wherein the at least one metal cyanide salt is selected from the group consisting of potassium hexacyanocobaltate (III), potassium hexacyanoferrate (II), potassium hexacyanoferrate(III), lithium hexacyanoiridate(III), lithium hexacyanocobaltate(III), sodium hexacyanocobaltate(III) and cesium hexacyanocobaltate(III).

11. The process of claim 8, wherein the at least one organ complexing ligand is selected from the group consisting of ethanol, isopropanol, n-butanol, iso-butanol, sec-butanol and tert-butyl alcohol.

12. The process of claim 8, wherein the at least one alkaline metal salt is selected from the group consisting of potassium chloride, sodium chloride, sodium bromide, lithium chloride and lithium bromide.

13. The process of claim 8, wherein the at least one functionalized polymer is present in an amount in the range of from about 2 to about 98 wt. %, based on the total weight of the double-metal cyanide catalyst.

14. The process of claim 8, wherein the at least one functionalized polymer is a polyether; polyester; polycarbonate; polyalkylene glycol sorbitan ester; polyalkylene glycol glycidyl ether; polyacrylamide; poly(acrylamide-co-acrylic acid), polyacrylic acid, poly(acrylic acid-co-maleic acid), poly(N-vinylpyrrolidone-co-acrylic acid), poly(acrylic acid-co-styrene) or their salts; maleic acid, styrene or maleic anhydride copolymers or their salts; polyacrylonitriles; polyalkyl acrylate; polyalkyl methacrylate; polyvinyl methyl ether; polyvinyl ethyl ether; polyvinyl acetate; polyvinyl alcohol; poly-N-vinylpyrrolidone; polyvinyl methyl ketone; poly(4-vinylphenol); oxazoline polymer; polyalkyleneimine; hydroxyethylcellulose; polyacetal; glycidyl ether; glycoside; carboxylic acid ester of polyhydric alcohol; bile acid or Its salt, ester or amide; cyclodextrin; phosphorus compound; unsaturated carboxylic acid ester; or an ionic surface- or interface-active compound.

* * * * *